United States Patent [19]

Hottes

[11] Patent Number: 4,538,400
[45] Date of Patent: Sep. 3, 1985

[54] ROTARY MOWER HAVING GROUND SUPPORTED FRAMES

[75] Inventor: Ronald W. Hottes, Selma, Ala.

[73] Assignee: Allied Products Corporation, Chicago, Ill.

[21] Appl. No.: 619,715

[22] Filed: Jun. 11, 1984

[51] Int. Cl.³ ............... A01D 69/08; A01D 35/264
[52] U.S. Cl. .......................... 56/11.8; 56/6; 56/13.6; 56/11.7; 172/75
[58] Field of Search ............ 56/6, 7, 11.8, 10.8, 56/11.7, 11.3, 159, 228, 13.6; 172/75, 103

[56] References Cited

U.S. PATENT DOCUMENTS

| | | | |
|---|---|---|---|
| 3,418,790 | 12/1968 | Whitfield | 56/6 |
| 3,527,032 | 9/1970 | Wood | 56/6 |
| 3,945,175 | 3/1976 | Barkstrom et al. | 56/10.8 |
| 3,968,630 | 7/1976 | Mitchell | 56/7 |
| 4,178,741 | 12/1979 | Lonn et al. | 56/7 |
| 4,429,515 | 2/1984 | Davis, Jr. et al. | 56/6 |

FOREIGN PATENT DOCUMENTS 2902557 8/1979 Fed. Rep. of Germany ...... 172/103

Primary Examiner—Gene Mancene
Assistant Examiner—John G. Weiss
Attorney, Agent, or Firm—Lockwood, Alex, Fitzgibbon & Cummings

[57] ABSTRACT

A mower embodies a translatable main frame connectable to a towing vehicle having a power take-off unit connectable to a transmission carried by the main frame. At least one translatable wing frame is hingedly connected to an adjacent side of the main frame and is adapted to pivot selectively to a lower operative position and to an upper inoperative position. Depending cutter carrying shafts are supported for rotation on the main frame and the wing frame and are connected in driving relation with the transmission. An extensible drive shaft is operatively connected at one end to the depending shaft on the wing frame and a clutch operatively connects the other end of the extensible drive shaft to the transmission. An extensible clutch rod operatively connects the wing frame to a clutch actuator to move the clutch to an engaged position while the wing frame is in a lower operative position and to move the clutch to a disengaged position upon movement of the wing frame to an upper inoperative position. The wing frame is movable selectively to the lower operative position and to the upper inoperative position by a power unit.

8 Claims, 9 Drawing Figures

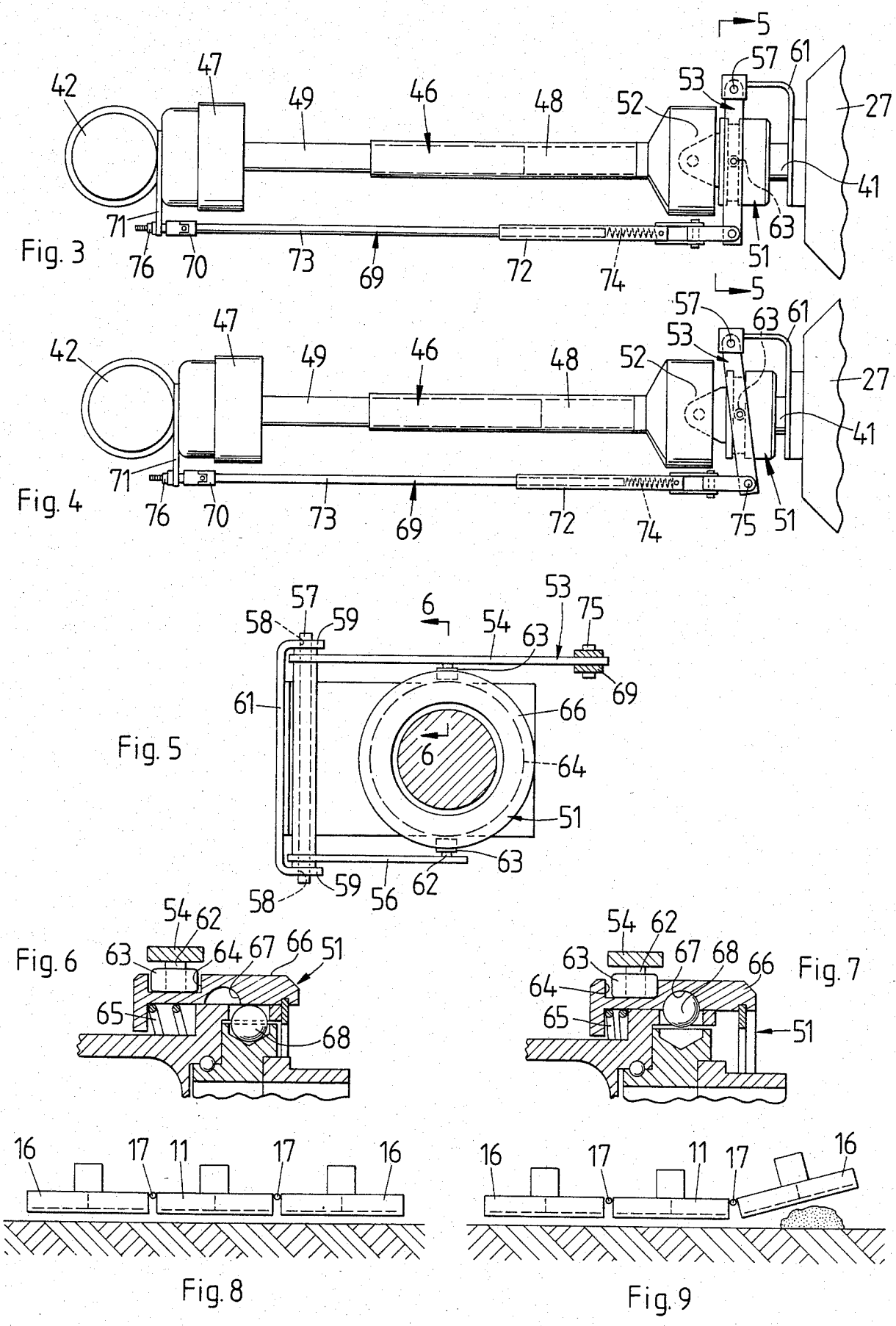

ROTARY MOWER HAVING GROUND SUPPORTED FRAMES

BACKGROUND OF THE INVENTION

This invention relates to a rotary mower having ground supported frames and more particularly to such a mower which has one or more wing frames which are hingedly connected to a main frame for pivotal movement relative thereto whereby the wing frames are adapted to be moved to a generally vertical position during transport from place to place and at the same time are adapted to move upwardly to clear any obstacles, such as rocks, posts and the like.

As is well known in the art to which my invention relates, difficulties have been encountered in the operation of mowers having wing frames which are adapted for pivotal movement relative to a main frame due to the fact that the rotary cutters continue to rotate after the wing frames have been elevated to move over obstacles. Accordingly, it is unsafe to raise the wing frames during the mowing operation and during transport of the mower from place to place.

BRIEF SUMMARY OF INVENTION

In accordance with my invention, I overcome the above difficulties by providing a positive disengaging clutch assembly between the cutter shaft of each wing frame and a transmission carried by the main frame for the mower. The clutch assembly includes an extensible clutch rod which operatively connects the wing frame to a clutch actuator which moves the clutch assembly to an engaged position while the wing frame is in a lower operative position and moves the clutch assembly to a disengaged position in response to movement of the wing frame to an upper inoperative position. Accordingly, the cutter shaft carried by each wing frame is automatically disengaged from its drive means each time a wing frame is pivoted upwardly a predetermined angular distance relative to the main frame. That is, no rotary motion is imparted to the cutter shaft carried by the wing frame while the wing frame is in its upper, inoperative position.

It will thus be seen that a primary object of my invention is to provide a rotary mower of the character designated which is extremely safe in operation due to the fact that there is no rotation of the cutter shafts carried by the wing frames while the wing frames are in their upper inoperative positions.

Another object of my invention is to provide a rotary mower which is extremely simple of construction, economical of manufacture and one which is positive in operation to selectively engage and disengage the cutter shaft of each wing frame with a source of power carried by the main frame.

Another object of my invention is to provide a rotary mower of the character designated which is particularly adapted for use in mowing large acreages of vegetation, such as grass, weeds, brush and the like.

BRIEF DESCRIPTION OF DRAWINGS

A mower embodying features of my invention is illustrated in the accompanying drawings, forming a part of this application, in which:

FIG. 3 is an enlarged, fragmental, top plan view showing the extensible drive means interposed between the transmission unit carried by the main frame and a depending cutter shaft mounted on a wing frame and showing an extensible clutch rod which operatively connects the wing frame to an actuator for a clutch unit which in turn provides a positive engaging and disengaging means between the extensible drive means and the transmission, with the extensible clutch rod and the clutch actuator in position to move the clutch unit to its engaged position;

FIG. 4 is a view corresponding to FIG. 3 showing the extensible clutch rod and the clutch actuator in position to move the clutch unit to its disengaged position;

FIG. 5 is an enlarged, sectional view taken generally along the line 5—5 of FIG. 3;

FIG. 6 is an enlarged, fragmental, sectional view showing a portion of a conventional type positive engaging clutch unit which may be employed, the clutch unit being shown in the engaged position;

FIG. 7 is a fragmental, sectional view corresponding to FIG. 6 showing the clutch unit in the disengaged position;

FIG. 8 is a diagrammatic view showing a wing frame hingedly mounted at each side of a main frame with all three frames extending in a common horizontal plane; and, FIG. 9 is a diagrammatic view corresponding to FIG. 8 and showing one of the wing frames as being pivoted upwardly relative to its wing frame to clear an obstacle projecting above the surface of the ground.

DETAILED DESCRIPTION

Figure 1:
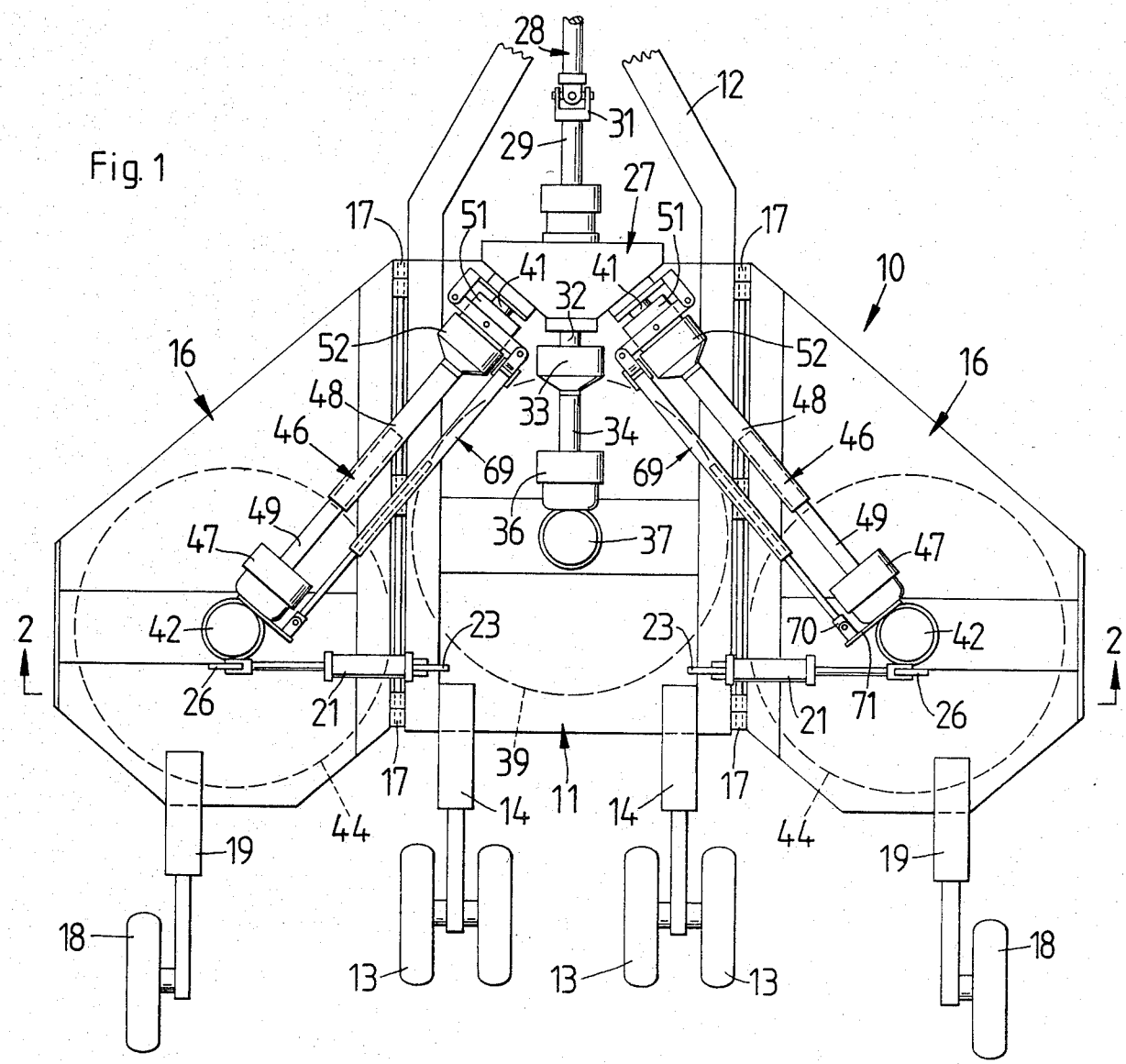
FIG. 1 is a top plan view showing my improved mower as having a main frame with a wing frame hingedly mounted at each side thereof and with each wing frame in its lower operative position.

Referring now to the drawings for a better understanding of my invention, I show a rotary mower generally at 10 having a translatable main frame 11 which is adapted to be connected to a suitable towing vehicle by a conventional draw bar arrangement, a portion of which is indicated at 12. The forward portion of the main frame 11 is thus supported at its forward end by the towing vehicle. The rear portion of the main frame 11 is supported by ground engaging wheels 13 which are carried by suitable wheel supports 14. In view of the fact that the draw bar arrangerent 12 is of a conventional type well known in the art to which my invention relates, no further description thereof is deemed necessary.

A translatable wing frame 16 is hingedly connected along one side thereof to an adjacent side of the main frame 11 by suitable hinge members 17 whereby each wing frame 16 is adapted for pivotal movement selectively to a lower operative position and to an upper inoperative position relative to the main frame 11. As shown in FIG. 1, the rear end of each wing frame 16 is supported by a ground engaging wheel 18 which is carried by a suitable wheel support assembly 19.

Figure 2:
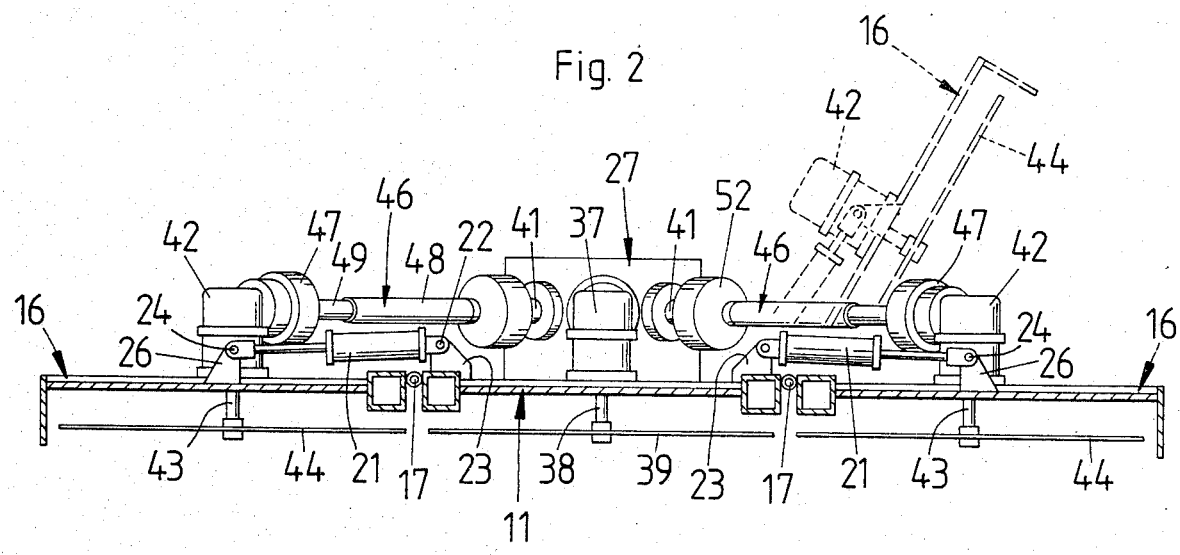
FIG. 2 is a sectional view taken generally along the line 2—2 of FIG. 1.

As shown in FIGS. 1 and 2, a fluid pressure operated power unit 21 is pivotally connected by a pivot pin 22 at one end thereof to a suitable supporting bracket 23 carried by the main frame 11. The other end of the power unit 21 is pivotally connected by a pivot pin 24 to a suitable supporting bracket 26 carried by a wing frame 16. The fluid pressure power operated unit 21 interposed between the main frame 11 and each wing frame 16 thus serves as a means for moving each wing frame 16 selectively to a lower operative position, as shown in FIG. 2 and to an upper inoperative position, as shown in dotted lines in FIG. 2. That is, each wing frame 16 is adapted for independent movement by its fluid pressure operated power unit 21 selectively to its lower operative position and to its upper inoperative position.

As shown in FIGS. 1 and 2, a transmission unit 27 is mounted on the main frame 11 adjacent the forward central portion thereof and is operatively connected to a conventional power take-off unit 28 carried by a conventional towing vehicle, such as a tractor. The transmission unit 27 is of a conventional type having an input shaft 29 connected to the power take off unit 28 by a universal joint 31. The transmission unit 27 is shown as having an output shaft 32 which extends in a generally horizontal plane above the longitudinal center line of the main frame 11, as shown in FIG. 1. The output shaft 32 is operatively connected by a universal joint 33 to a drive shaft 34 which in turn is operatively connected by a universal joint 36 to a conventional right angle drive unit 37. A depending cutter shaft 38 is supported for rotation by the right angle drive unit 37 and carries a conventional cutter element 39, as shown in FIG. 2.

As shown in FIGS. 1 and 2, the transmission unit 27 has a rearwardly and outwardly extending output shaft 41 at opposite sides of the output shaft 32. That is, the output shafts 41 are spaced an angular distance from the output shaft 32 whereby each output shaft 41 is directed toward a right angle drive unit 42 mounted on wing frame 16. Each right angle drive unit 42 is connected to a cutter shaft 43 which is supported for rotation on the wing frame 16 and carries a cutter element 44, as shown in FIG. 2.

An extensible drive shaft 46 is operatively connected at one end by a universal joint 47 to each right angle drive 42. Each extensible drive shaft 46 is shown as comprising telescoping shaft sections 48 and 49 which move relative to each other as the wing frame 16 associated therewith is pivoted relative to the main frame 11 by the fluid pressure power unit 21. The end of the extensible drive shaft 46 opposite the end thereof connected to the universal joint 47 is operatively connected to a clutch unit 51 by a universal joint 52.

The clutch unit 51 is of a conventional, positive engaging type which is actuated by a clutch actuator unit 53. The clutch actuator unit comprises a pair of parallel links 54 and 56 which are secured to and rotate with a transverse pin-like member 57, as shown in FIG. 5. The ends of the pin-like member 57 project beyond the links 54 and 56 and extend through suitable openings 58 provided in ear-like members 59 which in turn are carried by a generally L-shaped support bracket 61 which is secured to an adjacent portion of the transmission 27, as shown in FIGS. 3 and 4. Each of the parallel links 54 and 56 carry inwardly extending stub shafts 62 which in turn carry rollers 63 that ride within an annular recess 64 provided in a movable, sleeve-like housing 66 for the clutch unit 51, as shown in FIGS. 6 and 7. A compression spring 65 urges the sleeve-like housing 66 toward the left, as viewed in FIGS. 6 and 7. An annular, inwardly opening recess 67 is provided within the sleeve-like member 66 in position to receive a ball 68 when the sleeve-like member 66 is moved to the disengaged position shown in FIG. 7. That is, while the sleeve-like member 66 is in the position shown in FIG. 6, the ball 68 is retained in a position to provide positive engagement of the clutch elements whereby rotary movement is imparted from the transmission 27 to the extensible shaft 46 until the sleeve-like member 66 is shifted to the position shown in FIG. 7 whereby the ball 68 then moves outwardly into the recess 67 to thus disengage the clutch elements. In view of the fact that the clutch unit 51 is of a conventional type and the construction and operation thereof is well known in the art to which my invention relates, no further description thereof is deemed necessary.

An extensible clutch rod 69 is operatively connected at one end thereof to a universal joint 70 which in turn is connected to an upstanding bracket 71 carried by a wing frame 16, as shown. The clutch rod 69 is shown as comprising telescoping sections 72 and 73 which move relative to each other as the wing section 16 pivots relative to the main frame 11. A compression spring 74 is mounted within the outer telescoping section 72 in position to engage the adjacent end of the telescoping section 73, as shown in FIGS. 3 and 4, to serve as a shock absorber. The end of the clutch rod 69 opposite the end thereof connected to the universal joint 70 is pivotally connected to the outer end of the link 54 by a suitable pivot pin 75.

In view of the foregoing, it will be seen that upon upward pivotal movement of a wing section 16 by its fluid pressure operated power unit 21, the clutch rod 69 moves the actuator assembly 53 from the position shown in FIG. 3 to the position shown in FIG. 4 whereby the clutch unit 51 is disengaged. On the other hand, upon lowering the wing frame 16 to its operative position, the clutch rod 69 is extended whereby it moves the actuator assembly 53 from the position shown in FIG. 4 to the position shown in FIG. 3 to thus move the clutch unit to its engaged position. Accordingly, each time a wing frame 16 is pivoted upwardly beyond a predetermined angular distance relative to the main frame 11, the clutch unit 51 is disengaged whereby no power is transferred to its cutter shaft 43 and the cutter element 44 carried thereby. It will thus be seen that there is no rotation of the cutter element 44 after the wing frame 16 has moved upwardly above a predetermined angular position relative to the main frame 11. The effective length of the clutch rod 69 is adjustable by suitable means, such as by providing a lock nut 76 on a threaded end portion of the clutch rod 69, as shown in FIGS. 3 and 4. Accordingly, the position of the wing frame 16 at the time the clutch unit 51 is disengaged can be varied by varying the effective length of the clutch rod 69. It will be apparent to one skilled in the art that other means may be provided for varying the effective length of the clutch rod 69.

From the foregoing, it will be seen that I have devised an improved rotary mower which is safe in operation during transport of the mower from place to place as well as during actual operation of the mower. Also, by providing means for interrupting the source of power to the rotary cutters each time a wing frame is pivoted upwardly a predetermined angular distance, the operator of the mower does not have to actuate any additional means to interrupt the source of power to the cutter blades. Accordingly, each time the mower is to pass over an obstacle, such as a rock or the like, the operator merely actuates the fluid pressure operated power unit 21 which pivots the wing frame to its upper inoperative position to clear the obstacle. Furthermore, there is no accidental engagement of the clutch unit while the mower is transported from place to place due to the fact that the clutch rod 69 assures that the clutch unit remains disengaged at all times while the wing frame is pivoted upwardly beyond a predetermined angular distance relative to the main frame.

While I have shown my invention in but one form, it will be obvious to those skilled in the art that it is not so limited, but is susceptible of various changes and modifications without departing from the spirit thereof.

What I claim is:

1. In a rotary mower having a translatable ground supported main frame adapted to be connected to a towing vehicle having a power take-off unit:
   (a) a transmission unit carried by said main frame and operatively connected in driving relation to said power take-off unit,
   (b) at least one translatable wing frame hingedly connected along one side thereof to an adjacent side of said main frame and adapted for pivotal movement selectively to a lower operative position and to an upper inoperative position,
   (c) a depending shaft carried by and supported for rotation on said main frame and on said wing frame,
   (d) a cutter element carried by each said depending shaft,
   (e) means operatively connecting said transmission unit in driving relation with said depending shaft on said main frame,
   (f) an extensible drive shaft that is extensible along an axis and that is operatively connected at one end to said depending shaft on said wing frame,
   (g) a clutch unit operatively connecting the other end of said extensible drive shaft to said transmission unit and having a clutch actuator adapted to move a component of said clutch unit along an axis that is generally parallel to said axis along which the drive shaft is extensible, whereby the clutch unit is selectively moved to an engaged position and to disengaged position,
   (h) an extensible clutch rod operatively connecting said wing frame to said clutch actuator to move said clutch actuator in a direction to move said clutch unit to said engaged position while said wing frame is in said lower operative position and to move said clutch unit to said disengaged position in response to movement of said wing frame to said upper inoperative position, said extensible clutch rod being extensible along an axis that is generally parallel to said axis along which the drive shaft is extensible, and
   (i) means to move said wing frame selectively to said lower operative position and to said upper inoperative position.

2. A mower as defined in claim 1 in which a translatable wing frame is hingedly connected to each side of said main frame.

3. A mower as defined in claim 1 in which said means to move said wing frame selectively to said lower operative position and to said upper inoperative position comprises a fluid pressure operated power unit pivotally connected at one end thereof to said main frame and pivotally connected at its other end to said wing frame.

4. A mower as defined in claim 1 in which said upper inoperative position of said wing frame is located at a predetermined angular position of said wing frame relative to said main frame.

5. A mower as defined in claim 1 in which said extensible drive shaft comprises telescoping shaft sections.

6. A mower as defined in claim 1 in which the effective length of said extensible clutch rod is adjustable so that the position of said wing frame at the time said clutch unit is disengaged can be varied.

7. A mower as defined in claim 1 in which said depending shaft mounted for rotation on said wing frame is operatively connected to said extensible drive shaft by a universal joint and a right angle drive unit and said extensible drive shaft is operatively connected to said clutch unit by a universal joint.

8. A mower as defined in claim 1 in which said means operatively connecting said transmission unit in driving relation with said depending shaft on said main frame comprises a horizontal drive shaft operatively connected at one end to said transmission unit and operatively connected at its other end by a right angle drive unit to said depending shaft on said main frame.

* * * * *

UNITED STATES PATENT AND TRADEMARK OFFICE
CERTIFICATE OF CORRECTION

PATENT NO. : 4,538,400
DATED : September 3, 1985
INVENTOR(S) : Ronald W. Hottes

It is certified that error appears in the above-identified patent and that said Letters Patent are hereby corrected as shown below:

Column 2, line 48, "arrangerent" should read --arrangement--.
Column 5, line 37, please insert --a-- after "to" (second occurrence).

Signed and Sealed this

Eighth Day of April 1986

[SEAL]

Attest:

DONALD J. QUIGG

Attesting Officer

Commissioner of Patents and Trademarks